United States Patent
Coker et al.

(10) Patent No.: US 7,149,046 B1
(45) Date of Patent: Dec. 12, 2006

(54) DISK DRIVE IMPLEMENTING WEAR PREVENTION IN A HIGH FREQUENCY ACCESS BAND OF TRACKS

(75) Inventors: Kenny T. Coker, Corona, CA (US); Michael S. Rothberg, Foothill Ranch, CA (US); Daniel A. Hanson, Anaheim, CA (US); Mark F. Vallis, Rancho Santa Margarita, CA (US); Quoc N. Dang, Brea, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/134,916

(22) Filed: May 23, 2005

(51) Int. Cl.
*G11B 21/02* (2006.01)
*G11B 5/596* (2006.01)

(52) U.S. Cl. .................. 360/75; 360/78.04; 711/111
(58) Field of Classification Search .............. None
See application file for complete search history.

(56) References Cited

U.S. PATENT DOCUMENTS

| 4,445,188 | A | * | 4/1984 | Barrett | 360/75 |
| 4,987,502 | A | * | 1/1991 | Freeze | 360/75 |
| 5,050,015 | A | * | 9/1991 | Hack et al. | 360/75 |
| 5,859,738 | A | | 1/1999 | Forehand et al. | |
| 6,009,537 | A | | 12/1999 | Tanimoto et al. | |
| 2002/0135922 | A1 | * | 9/2002 | Smith | 360/69 |
| 2003/0107835 | A1 | | 6/2003 | Duvall et al. | |

* cited by examiner

*Primary Examiner*—Andrew L. Sniezek
(74) *Attorney, Agent, or Firm*—Howard H. Sheerin, Esq.

(57) ABSTRACT

A disk drive is disclosed comprising a disk having a plurality of tracks, a head actuated over the disk, and control circuitry for servicing an access command received from a host, wherein the access command identifies at least one of the tracks. The control circuitry identifies a band of tracks associated with the access command, maintains a counter for tracking an amount of time the head is within the band of tracks, and moves the head out of the band of tracks in response to the counter to facilitate wear prevention.

24 Claims, 6 Drawing Sheets

DISK DRIVE IMPLEMENTING WEAR PREVENTION IN A HIGH FREQUENCY ACCESS BAND OF TRACKS

BACKGROUND OF THE INVENTION

1. Field of the Invention

The present invention relates to disk drives for computer systems. More particularly, the present invention relates to a disk drive implementing wear prevention in a high frequency access band of tracks.

2. Description of the Prior Art

In disk drives, a head is actuated radially over a disk in order to access a target track recorded on the disk. The head is attached to a distal end of an actuator arm which is rotated about a pivot by a voice coil motor during seek operations. As the disk rotates, an air bearing forms which causes the head to "fly" just above the disk surface while writing magnetic transitions during a write operation, or reading the magnetic transitions during a read operation. The head comprises a slider having an air bearing surface and an integrated transducer, such as a write coil and a magnetoresistive read element.

Decreasing the distance between the transducer and disk surface (fly-height) improves the signal-to-noise ratio in the read signal, thereby enabling higher recording densities (radial tracks per inch and linear bits per inch). However, decreasing the fly-height can deplete the lubricating film that covers the disk surface, particularly if the head remains at the same radial location over an extended period of time. This depletion increases the chance the head will contact the recording surface causing damage and data loss. Designers have implemented wear prevention techniques by dithering the location of the head while the disk drive is idle (not performing read or write operations). However, certain applications may repeatedly access (read or write) data located in a narrow band of tracks over a number of high frequency commands preventing the disk drive from entering the idle mode to perform wear prevention. This can lead to wear in the band of tracks associated with the high frequency accesses.

There is, therefore, a need to reduce wear in a disk drive that performs a number of high frequency accesses to a band of tracks without entering an idle mode.

SUMMARY OF THE INVENTION

The present invention may be regarded as a disk drive comprising a disk having a plurality of tracks, a head actuated over the disk, and control circuitry for servicing an access command received from a host, wherein the access command identifies at least one of the tracks. A band of tracks associated with the access command is identified, and a counter is maintained for tracking an amount of time the head is within the band of tracks. The head is moved out of the band of tracks in response to the counter to facilitate wear prevention.

In one embodiment, the control circuitry maintains the counter in connection with servicing a plurality of access commands received from the host.

In another embodiment, the control circuitry increments the counter while the head is within the band of tracks, and decrements the counter while the head is outside of the band of tracks. In one embodiment, the control circuitry enables wear prevention if the counter exceeds a first threshold, and while the wear prevention is enabled, moves the head outside the band of tracks in connection with each access command identifying a target track within the band of tracks. In one embodiment, the control circuitry moves the head outside the band of tracks before servicing each access command identifying a target track within the band of tracks while the wear prevention is enabled. In an alternative embodiment, the control circuitry moves the head outside the band of tracks after servicing each access command identifying a target track within the band of tracks while the wear prevention is enabled.

In yet another embodiment, the control circuitry disables the wear prevention if the counter falls below a second threshold less than the first threshold.

In still another embodiment, the control circuitry maintains the head outside the band of tracks for a predetermined interval in response to the counter, wherein in one embodiment, the predetermined interval is programmable.

In one embodiment, the control circuitry maintains the counter during a periodic interrupt, in an alternative embodiment, during a task of a multi-tasking operating system, and in another embodiment, in response to a time stamp associated with each access command.

The present invention may also be regarded as a method of operating a disk drive comprising a disk having a plurality of tracks, and a head actuated over the disk. An access command is received from a host, wherein the access command identifies at least one of the tracks. A band of tracks associated with the access command is identified, and a counter is maintained for tracking an amount of time the head is within the band of tracks. The head is moved out of the band of tracks in response to the counter to facilitate wear prevention.

DESCRIPTION OF THE PREFERRED EMBODIMENTS

Figures 1A, 1B:
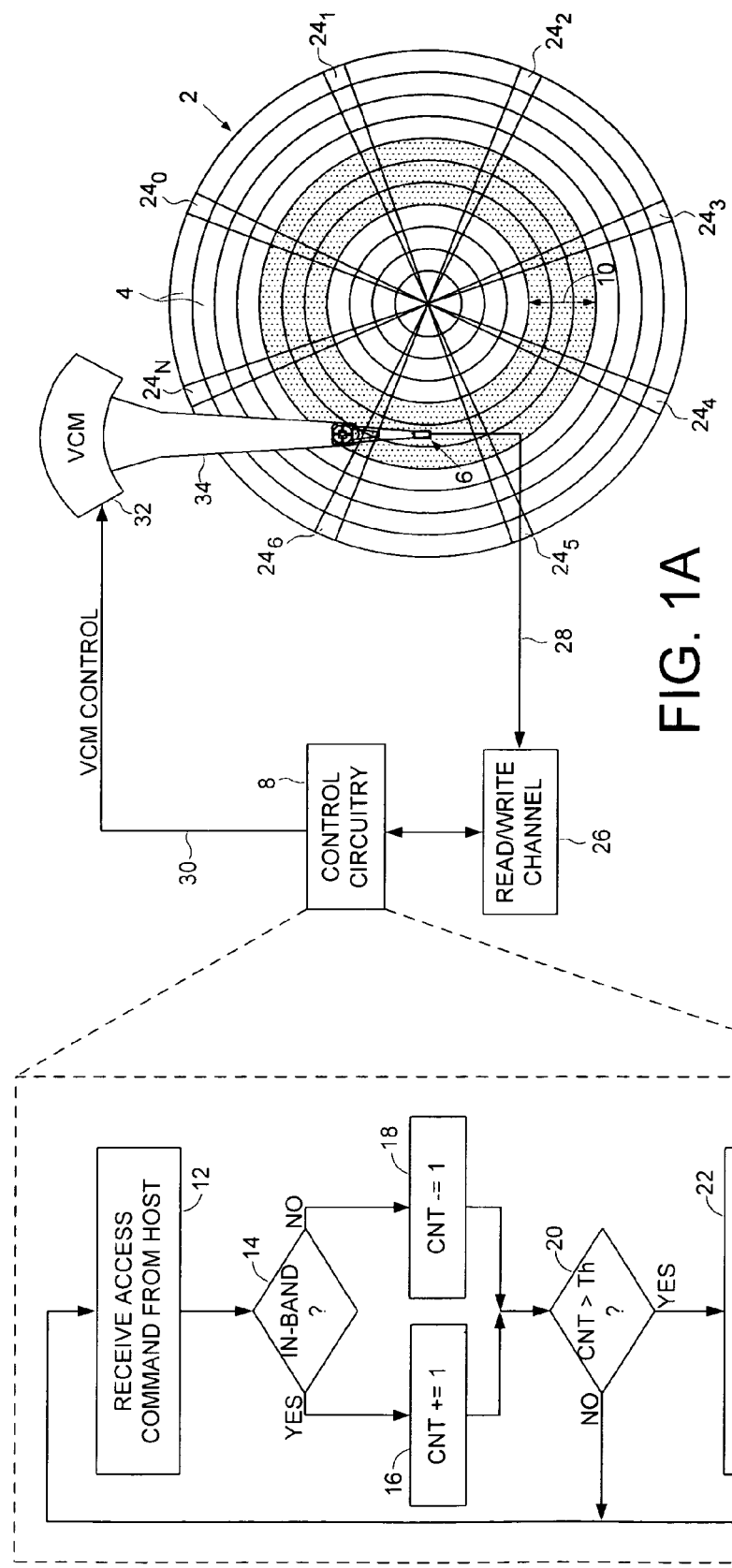
FIG. 1A shows a disk drive according to an embodiment of the present invention, including a disk, a head actuated over the disk, and control circuitry for servicing access commands received from a host.
FIG. 1B is a flow diagram according to an embodiment of the present invention executed by the control circuitry to identify a band of tracks for performing wear prevention if the head remains in the band for an extended period while servicing the access commands received from the host.

FIG. 1A shows a disk drive according to an embodiment of the present invention comprising a disk 2 having a plurality of tracks 4, a head 6 actuated over the disk 2, and control circuitry 8 for servicing an access command received from a host, wherein the access command identifies at least one of the tracks 4. The control circuitry 8 identifies a band of tracks 10 associated with the access command, maintains a counter for tracking an amount of time the head is within the band of tracks 10, and moves the head 6 out of the band of tracks 10 in response to the counter to facilitate wear prevention.

FIG. 1B is a flow diagram executed by the control circuitry 8 for performing the wear prevention according to an embodiment of the present invention. At step 12 the control circuitry 8 receives an access command from the host for servicing. If while servicing the access command at step 14 the head 6 is within the band of tracks 10, at step 16 the counter is incremented, otherwise the counter is decremented at step 18. If at step 20 the counter exceeds a threshold, then at step 22 the head 6 is moved out of the band of tracks 10 to prevent the head 6 from depleting the lubricating film that covers the disk surface.

In the embodiment of FIG. 1A, the disk 2 comprises a plurality of embedded servo sectors $24_0$–$24_N$ each comprising coarse head position information, such as a track address, and fine head position information, such as servo bursts. As the head 6 passes over each servo sector, a read channel 26 processes the read signal 28 emanating from the head 6 to demodulate the position information. The control circuitry 8 processes the position information to generate a control signal 30 applied to a voice coil motor (VCM) 32. The VCM 32 rotates an actuator arm 34 about 34 about a pivot in order to position the head 6 over a target track during a seek operation, and maintain the head 6 over the target track during a tracking operation.

Figure 2:
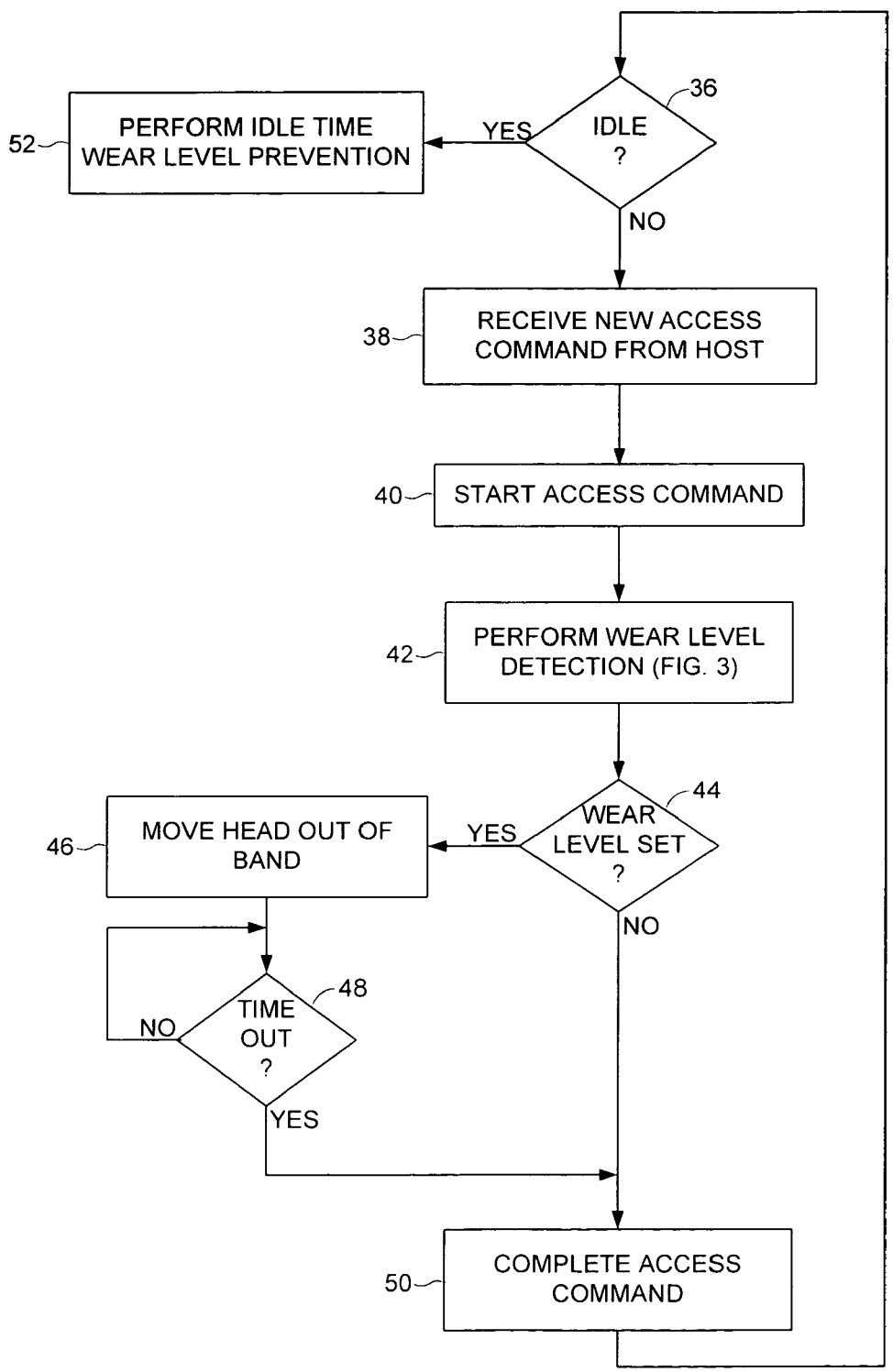
FIG. 2 is a flow diagram according to an embodiment of the present invention wherein while the wear prevention is enabled the head is moved outside the band of tracks prior to servicing each access command received from the host.
Figure 3:
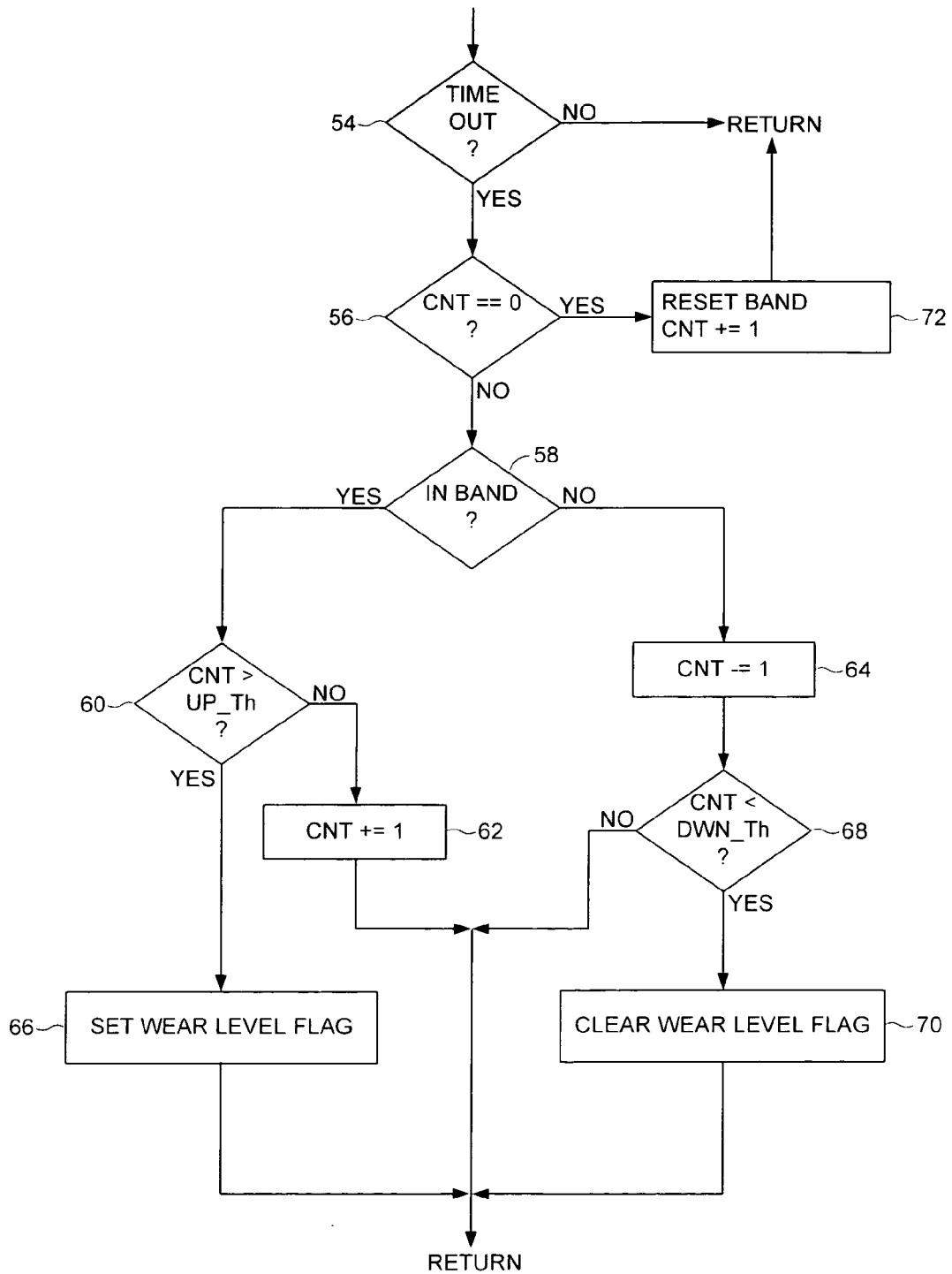
FIG. 3 is a flow diagram according to an embodiment of the present invention wherein the wear prevention is enabled if a counter exceeds a first threshold, and disabled if the counter falls below a second threshold.

FIG. 2 is a flow chart according to an embodiment of the present invention wherein the control circuitry 8 maintains the counter in connection with servicing a plurality of access commands received from the host. If at step 36 the disk drive is not idle, then at step 38 the control circuitry 8 receives a new access command from the host. At step 40 the access command is started by seeking the head 6 to the target track identified by the access command (the head 6 may already be on the target track in which case there is no seek). At step 42 a wear level detection algorithm is executed to update the counter, an example of which is shown in FIG. 3. If the wear prevention is enabled at step 44, then at step 46 the control circuitry 8 moves the head 6 outside of the band of tracks 10. At step 48 the control circuitry 8 maintains the head 6 outside of the band of tracks 10 for a predetermined interval, and then at step 50 the access command is completed by seeking the head 6 back to the target track and performing the requested read or write command.

If at step 36 the disk drive is idle (e.g., hasn't received an access command from the host for a predetermined interval), at step 52 the control circuitry 8 enters an idle time weal level prevention algorithm. In one embodiment, during idle time the control circuitry 8 periodically seeks the head 6 in a random pattern to prevent the head 6 from wearing down any single track. In one embodiment, the seeks during idle time are executed similar to an access command received fro the host so that the counter is updated accordingly. That is, the control circuitry 8 maintains the counter during idle time so that when an access command is received at step 38 the counter reflects the amount of time the head 6 has spent outside the band of tracks 10 during the idle time.

FIG. 3 is a flow diagram according to an embodiment of the present invention for performing the wear level detection algorithm at step 42 of FIG. 2 after receiving a new access command from the host. If at step 54 a timer has expired, and the counter is not zero at step 56, then at step 58 a branch is executed depending on whether the head 6 is inside or outside the band band of tracks 10. If inside, and at step 60 the counter is not greater than a first threshold, then at step 62 the counter is incremented. If the head 6 is outside the band of tracks 10 at step 58, then the counter is decremented at step 64. If at step 60 the counter exceeds the first threshold, a wear level flag is set at step 66 thereby enabling the wear prevention. If at step 68 the counter is less than a second threshold, then the wear level flag is cleared at step 70 thereby disabling the wear prevention. In one embodiment, the second threshold is selected to achieve a desirable hysteresis so that the wear prevention remains enabled even though the counter falls below the first threshold. If at step 56 the counter decrements to zero, then at step 72 the band of tracks 10 is reset, for example, by identifying a band of tracks surrounding the most recent access command.

In one embodiment, the predetermined interval the head 6 is maintained outside the band of tracks 10 is programmable, and in one embodiment, adjusted in response to the value of the counter. For example, the predetermined interval at step 48 of FIG. 2 may be decreased as the counter decrements toward the second threshold at step 64 of FIG. 3.

Figure 5A:
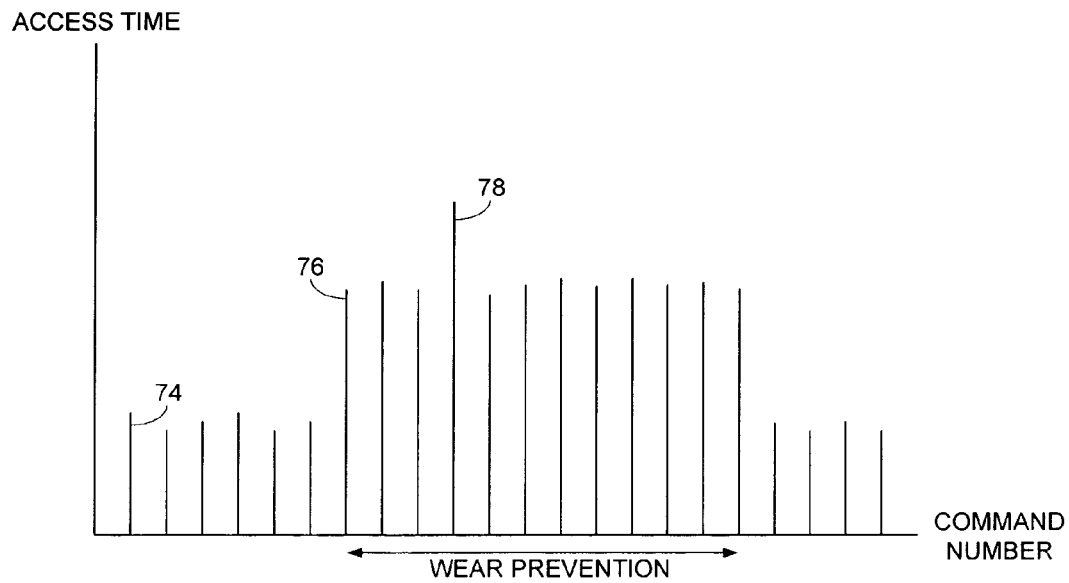
FIG. 5A illustrates how the wear prevention algorithm of FIG. 2 increases the access time of the disk drive for each access command by moving the head outside the band of tracks for each access command.

In the embodiment of FIG. 2, the control circuitry 8 moves the head 6 outside the band of tracks 10 while the wear prevention is enabled for each access command received from the host. In one embodiment, the control circuitry 8 moves the head 6 outside the band of tracks 10 prior to executing each access command, an in alternative embodiment, after executing each access command. FIG. 5A illustrates how the wear prevention embodiment of FIG. 2 affects the access time of the disk drive. In this example, the control circuitry 8 begins servicing access commands that keep the head 6 within the band of tracks 10 starting with access command 74. When access command 76 is serviced, the wear prevention is enabled and the access time increases due to the control circuitry 8 moving the head 6 outside of the band of tracks 10 prior to executing each access command. Access command 78 identifies a track outside the band of tracks 10 which causes the counter to decrement, but not enough to disable the wear prevention. Once the head 6 remains outside the band of tracks 10 long enough for the counter to fall under the second threshold (step 68 of FIG. 3), the wear prevention is disabled and the access time reverts to a normal pattern.

Figure 4:
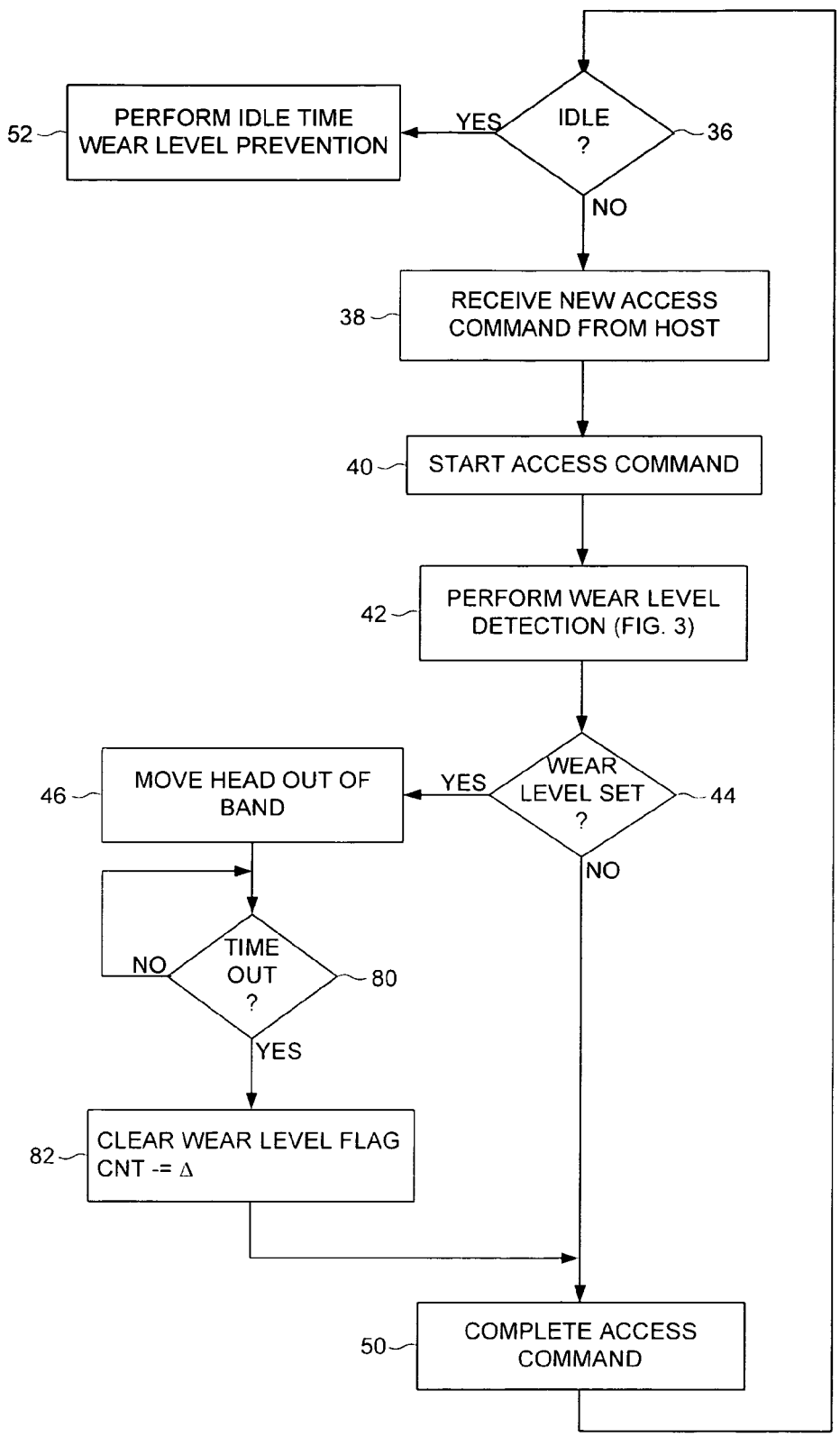
FIG. 4 is a flow diagram according to an embodiment of the present invention wherein while the wear prevention is enabled the head is moved outside the band of tracks for a predetermined interval.
Figure 5B:
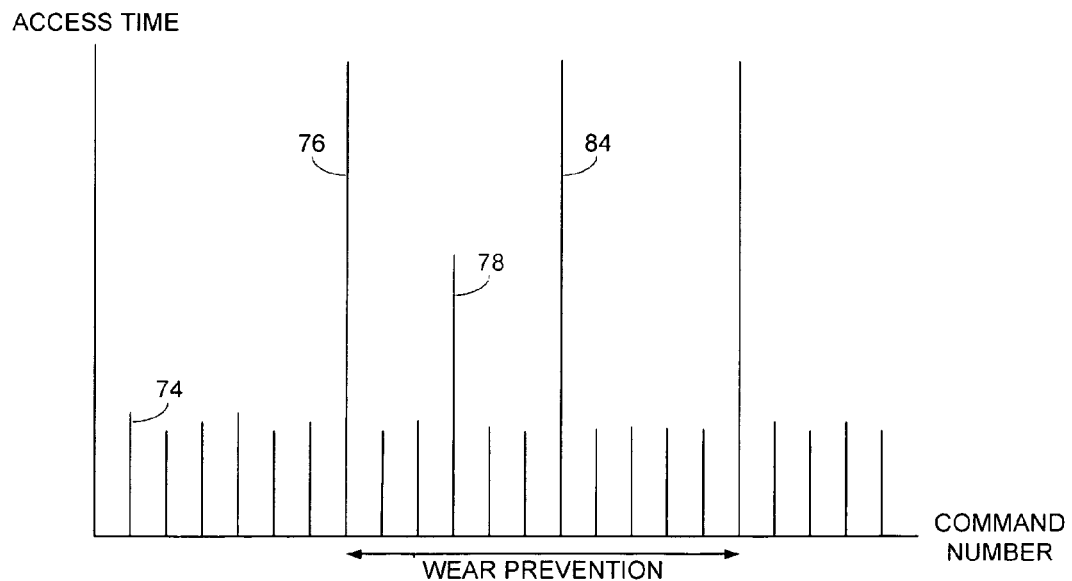
FIG. 5B illustrates how the wear prevention algorithm of FIG. 4 periodically increases the access time by moving the head outside the band of tracks for the predetermined interval.

FIG. 4 is a flow diagram according to an alternative embodiment of the present invention similar to FIG. 2 except that the time out interval at step 80 is extended to increase the time the head 6 is maintained outside the band of tracks 10. At step 82 the wear level flag is cleared and the counter is decremented by a predetermined delta that brings the counter below the second threshold. In this embodiment, the head 6 is allowed to remain within the band of tracks 10 for a longer period so that a number of accessed commands can be serviced before the head 6 is again moved outside the band of tracks 10. This is illustrated in FIG. 5B which shows how the flow diagram of FIG. 4 affects the access time of the disk drive. When access command 76 is serviced, the wear prevention is enabled and the access time is increased even more than FIG. 5A due to the extended time out period (step 80 of FIG. 4). After servicing access command 76 several subsequent access commands are executed that access tracks within the band of tracks 10 without seeking away. When access command 78 is executed (which accesses a track outside the band of tracks 10), the counter is decremented allowing subsequent access commands within the band of tracks 10 to be serviced before the control circuitry 8 seeks away prior to servicing access command 84.

The counter used to implement the wear level protection algorithm may be maintained using any suitable technique. In one embodiment, the control circuitry 8 maintains the counter during a periodic interrupt. In another embodiment, the control circuitry 8 maintains the counter during a task of a multi-tasking operating system. In yet another embodiment, the control circuitry 8 maintains the counter as each access command is received from the host in response to a time stamp associated with each access command. That is, a time stamp is taken as each access command is received from the host. The counter is incremented by the current time stamp if the head 6 was within the band of tracks 10 prior to receiving the access command, otherwise the counter is decremented by the time stamp. While wear prevention is enabled (including idle time wear prevention), the seeks are processed similar to an access command in order to update the counter using the time stamp. That is, the seek operation to move the head 6 outside the band of tracks 10 is processed similar to an access command as well as the seek operation to move the head 6 back into the band of tracks 10. In this manner, the corresponding time stamps can be used to update (decrement) the counter using the difference between the time stamps. Similarly, the seek operations during the idle time wear prevention are processed similar to access commands so that the corresponding time stamps can be used to update (decrement) the counter while the head 6 is outside the band of tracks 10.

Figure 6:
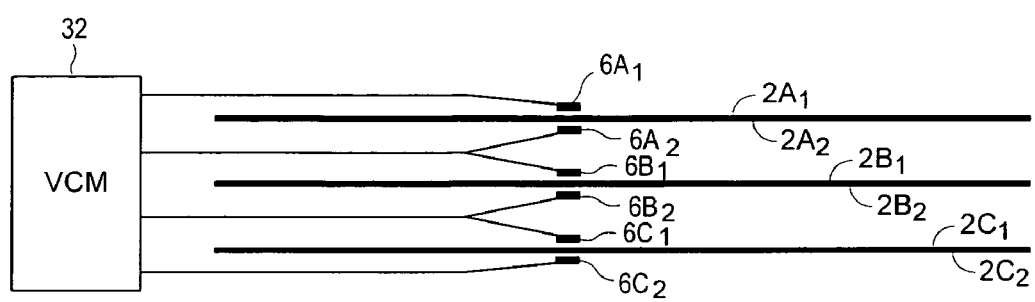
FIG. 6 shows an embodiment of the present invention wherein the disk drive comprises a plurality of disks and corresponding heads for accessing each disk surface, wherein the band of tracks wear protected corresponds to a cylinder of tracks extending to each disk surface.

FIG. 6 shows an embodiment of the present invention wherein the disk drive comprises a plurality of disks 2A–2C, each comprising a top surface (e.g., 2A₁) and bottom surface (e.g., 2A₂) and corresponding heads (e.g., 6A₁ and 6A₂). In this embodiment, the band of tracks 10 of FIG. 1A is a cylinder of tracks extending to each disk surface, such that the counter is incremented if any one of the heads 6A–6C access a track (cylinder) within the band of tracks 10 on each disk surface. This embodiment prevents wearing of each disk surface even though the access commands may be alternating access to different disk surfaces.

In yet another embodiment, the control circuitry 8 performs wear prevention for two or more bands of tracks (or cylinders). For example, the host may be accessing two data streams recorded in two corresponding bands of tracks. If the head 6 remains in either band of tracks for an extended period, the control circuitry 8 enables the wear prevention to prevent the head 6 from remaining within either band too long. In one embodiment, the control circuitry 8 buffers a number of access commands in a command queue and services the commands in an order that prevents wear in any particular band of tracks. In yet another embodiment, the control circuitry 8 executes a rotational position optimization (RPO) algorithm in order to select the commands from the command queue in an order that minimizes the access latency (seek and rotational latency). The RPO algorithm is modified so that the commands are selected from the command queue to prevent wear in any particular band of tracks even though the access latency may be increased.

We claim:

1. A disk drive comprising:
   (a) a disk comprising a plurality of tracks;
   (b) a head actuated over the disk; and
   (c) control circuitry for:
       servicing an access command received from a host, wherein the access command identifies at least one of the tracks;
       identifying a band of tracks associated with the access command;
       maintaining a counter for tracking an amount of time the head is within the band of tracks; and
       moving the head out of the band of tracks in response to the counter to facilitate wear prevention.

2. The disk drive as recited in claim 1, wherein the control circuitry for maintaining the counter in connection with servicing a plurality of access commands received from the host.

3. The disk drive as recited in claim 1, wherein the control circuitry for:
   (a) incrementing the counter while the head is within the band of tracks; and
   (b) decrementing the counter while the head is outside of the band of tracks.

4. The disk drive as recited in claim 3, wherein the control circuitry for:
   (a) servicing a plurality of access commands received from the host;
   (b) enabling a wear prevention if the counter exceeds a first threshold; and
   (c) while the wear prevention is enabled, moving the head outside the band of tracks in connection with each access command identifying a target track within the band of tracks.

5. The disk drive as recited in claim 4, wherein the control circuitry for moving the head outside the band of tracks before servicing each access command identifying a target track within the band of tracks while the wear prevention is enabled.

6. The disk drive as recited in claim 4, wherein the control circuitry for moving the head outside the band of tracks after servicing each access command identifying a target track within the band of tracks while the wear prevention is enabled.

7. The disk drive as recited in claim 4, wherein the control circuitry for disabling the wear prevention if the counter falls below a second threshold less than the first threshold.

8. The disk drive as recited in claim 1, wherein the control circuitry for maintaining the head outside the band of tracks for a predetermined interval in response to the counter.

9. The disk drive as recited in claim 8, wherein the predetermined interval is programmable.

10. The disk drive as recited in claim 1, wherein the control circuitry for maintaining the counter during a periodic interrupt.

11. The disk drive as recited in claim 1, wherein the control circuitry for maintaining the counter during a task of a multi-tasking operating system.

12. The disk drive as recited in claim 1, wherein the control circuitry for:
   (a) servicing a plurality of access commands received from the host; and
   (b) maintaining the counter in response to a time stamp associated with each access command.

13. A method of operating a disk drive, the disk drive comprising a disk having a plurality of tracks, and a head actuated over the disk, the method comprising the steps of:
   (a) servicing an access command received from a host, wherein the access command identifies at least one of the tracks;
   (b) identifying a band of tracks associated with the access command;
   (c) maintaining a counter for tracking an amount of time the head is within the band of tracks; and
   (d) moving the head out of the band of tracks in response to the counter to facilitate wear prevention.

14. The method as recited in claim 13, wherein the counter is maintained in connection with servicing a plurality of access commands received from the host.

15. The method as recited in claim 13, wherein the step of maintaining the counter comprises the steps of:
   (a) incrementing the counter while the head is within the band of tracks; and
   (b) decrementing the counter while the head is outside of the band of tracks.

16. The method as recited in claim 15, wherein the step of moving the head comprises the steps of:
   (a) servicing a plurality of access commands received from the host:
   (b) enabling a wear prevention if the counter exceeds a first threshold; and
   (c) while the wear prevention is enabled, moving the head outside the band of tracks in connection with each access command identifying a target track within the band of tracks.

17. The method as recited in claim 16, wherein the head is moved outside the band of tracks before servicing each access command identifying a target track within the band of tracks while the wear prevention is enabled.

18. The method as recited in claim 16, wherein the head is moved outside the band of tracks after servicing each access command identifying a target track within the band of tracks while the wear prevention is enabled.

19. The method as recited in claim 16, further comprising the step of disabling the wear prevention if the counter falls below a second threshold less than the first threshold.

20. The method as recited in claim 13, the head is moved outside the band of tracks for a predetermined interval in response to the counter.

21. The method as recited in claim 20, wherein the predetermined interval is programmable.

22. The method as recited in claim 13, wherein the counter is maintained during a periodic interrupt.

23. The method as recited in claim 13, wherein the counter is maintained during a task of a multi-tasking operating system.

24. The method as recited in claim 13, wherein the step of maintaining the counter comprises the steps of:
   (a) servicing a plurality of access commands received from the host; and
   (b) maintaining the counter in response to a time stamp associated with each access command.

* * * * *